Nov. 2, 1926.  
J. J. SEXTON  
1,605,567  
MOTOR STAND  
Filed March 14, 1925  2 Sheets-Sheet 1
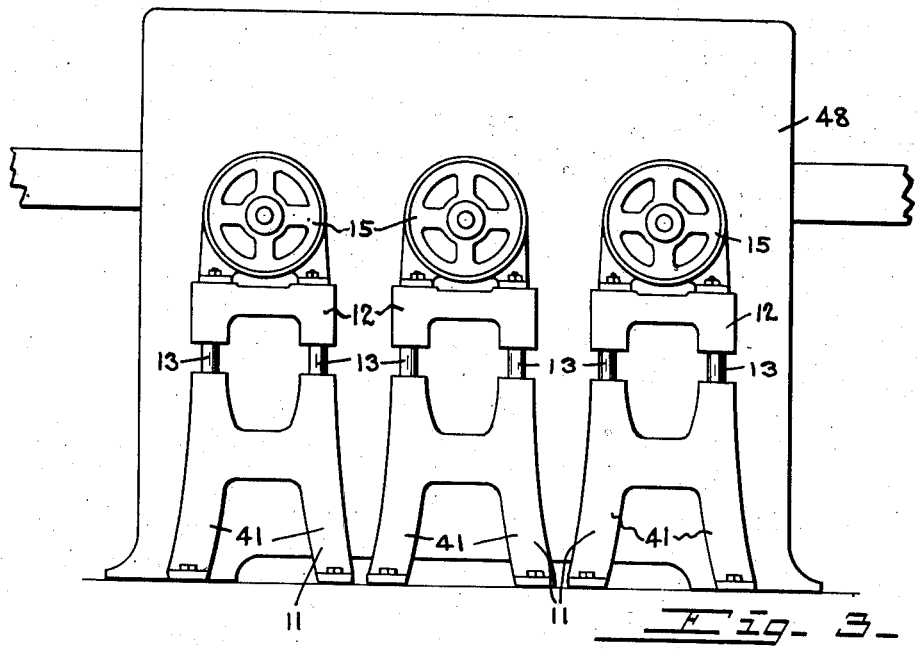
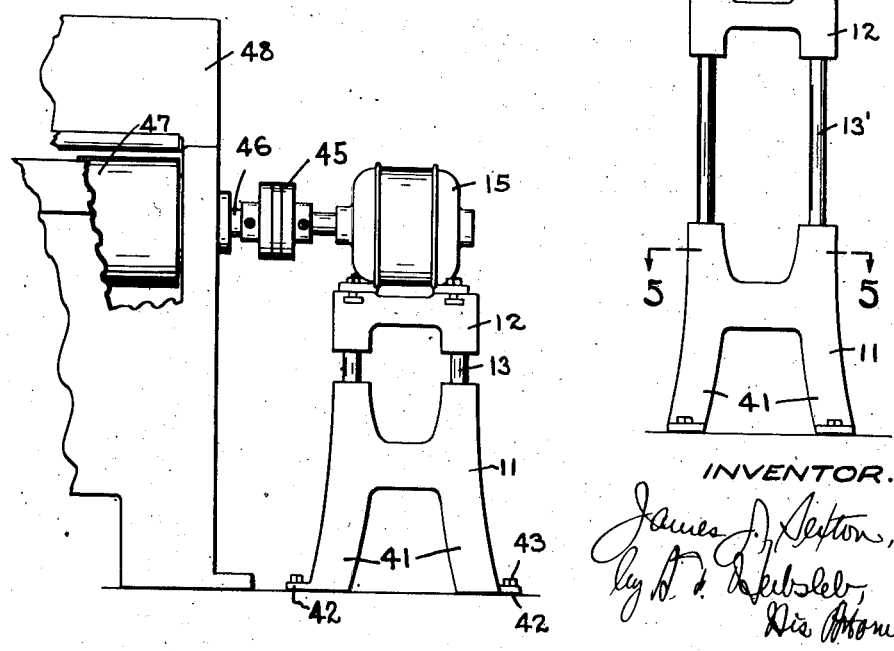
INVENTOR.

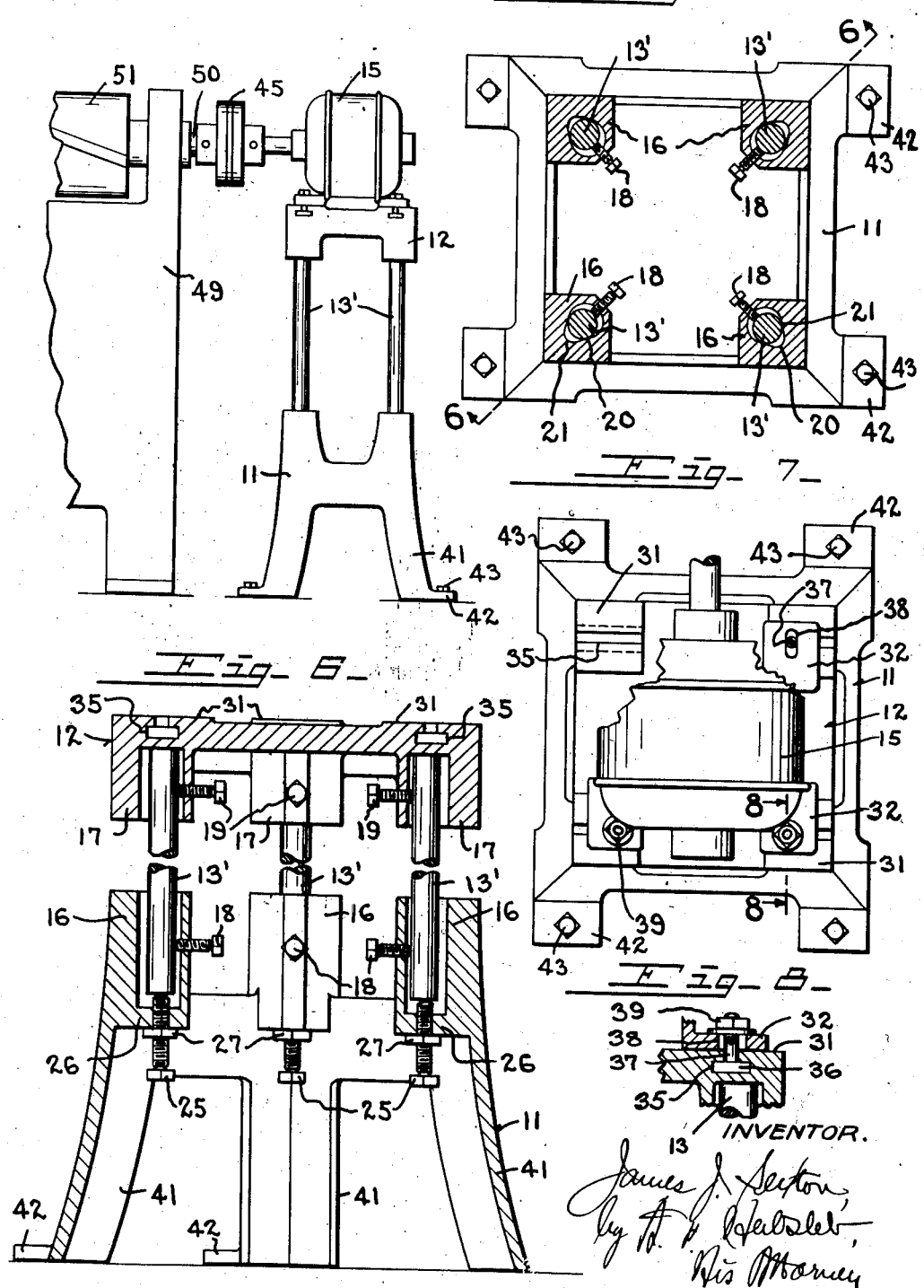

Patented Nov. 2, 1926.

1,605,567

UNITED STATES PATENT OFFICE.

JAMES J. SEXTON, OF COLUMBUS, OHIO.

MOTOR STAND.

Application filed March 14, 1925. Serial No. 15,433.

It is the object of my invention to provide a motor stand adapted for being placed in selective positions adjacent to machinery; further, to provide a novel motor stand comprising a motor support and novel means for positioning said support so as to locate the motor thereon in correct relation with the machine and with the shaft of the machine which the motor is to operate; and, further, to provide novel adjusting means for the motor stand and the parts of which are arranged to be fixed in definite relations for securely and rigidly supporting the motor thereon.

The invention will be further readily understood from the following description and claims, and from the drawings, in which latter:

Fig. 1 represents a side elevation of a machine, partly broken away, to which a plurality of my improved motor stands have been applied.

Fig. 2 is a front elevation of the same, partly broken away.

Fig. 3 is a side elevation of my improved device, showing the motor support elevated to different position from that shown in Figs. 1 and 2.

Fig. 4 is a front view of the same, shown in connection with a part of a machine.

Fig. 5 is a horizontal cross-section of the same, taken on the line 5—5 of Fig. 3.

Fig. 6 is a vertical section of the same, partly broken away, taken in the plane of the line 6—6 of Fig. 5.

Fig. 7 is a plan view of my improved device, partly broken away; and,

Fig. 8 is a cross-section of the same, taken in the plane of the line 8—8 of Fig. 7.

My improved device comprises a base 11 and a support 12, connected by posts 13, in such manner that the support may be secured at various elevations with relation to the base for forming what may in effect be termed a vertically extensible pedestal, on which an electric motor 15 is arranged to be secured.

The base is provided with upright bearings 16 for receiving the lower ends of the posts, and the support is provided with depending bearings 17 for receiving the upper ends of the posts. The bearings 16 are shown formed as upward extensions of the base. Set-screws 18 are arranged to clamp the posts in the bearings of the base, and set-screws 19 are arranged to clamp the posts in the bearings of the support. These set-screws are threaded into said bearings and are arranged to press upon the posts.

The bores of the bearings are preferably of such form in cross-section as to form a pair of spaced-apart contact lines between the respective posts and their bearings, being shown contracting in cross-section at one of their ends, as at 20, with the major axes of said bores extending in the directions of said set-screws, so that the clamping action of the set-screws upon the posts crowds said posts between the converging walls of said bores, for wedging said posts in said bores, and forming upright spaced-apart lines of contact 21 between said posts and the walls of said bores at each side of the axis of the set-screw, the set-screw acting on said posts at points spaced from said lines of contact, for providing what may be termed a three-point clamp for each post in its bearing.

The upper walls of the bores of the bearings in the support preferably rest upon the upper ends of the posts. The lower ends of the posts are preferably supported by adjusting screws 25, threaded into the lower walls 26 of the bores of the bearings in the base, the adjustments of said adjusting screws raising or lowering the posts, and thereby raising or lowering the support at its respective corners, for placing the support at proper elevation and leveling the same, or adjusting the same with relation to a horizontal plane, for adjusting the motor shaft in axial line with the shaft to be driven thereby. Clamp-nuts 27 are arranged to clamp the adjusting bolts in adjusted positions.

Means are provided for securing electric motors of various sizes and structures upon the support. The upper face of the support is provided with seats 31 on which the feet 32 of the electric motor 15 are arranged to rest. Means are provided for securing said feet to said support or table.

If desired, the top face of the support may be provided with T-slots 35, in which the heads 36 of bolts 37 are arranged to be received, the threaded ends of the bolts extending upwardly and received through slots 38 in the feet of the motor, nuts 39 securing the motor in place. The bolts 37 may be placed in selective positions lengthwise of the T-slots, for adjusting the motor laterally; and the slots 38 permit the motor to be moved on the support toward and from the driven shaft.

The base may be provided with legs 41 having feet 42, through which lag-screws 43 are arranged to be received into the floor or resting surface of the base.

If desired, posts of various lengths may be employed to accommodate various desirable heights of supports with relation to the bases for additional variation in height of the motor stand, such different lengths of posts being exemplified respectively at 13 in Fig. 1 and at 13′ in Fig. 3.

The motor shaft and the driven shaft of the machine may be provided respectively with the members of a usual coupling, for instance, a flexible coupling 45, for attaching the driving shaft of the electric motor to any desirable driven shaft of any suitable machine.

I have in Figs. 1 and 2 exemplified my improved device as arranged for driving the shafts 46, of usual sanding cylinders 47 of a triple drum sanding machine 48 employed in the wood-working art. These sanding cylinders are cylinders suitably packed and covered with sand-paper of usual construction in this art. The three motors shown are arranged for independently driving the three sanding cylinders, the motor stands being so placed and the adjustments thereof so made as to locate the axes of rotation of the rotors of the electric motors in line with the axes of rotation of the respective sanding cylinders, illustrating the adaptability, compactness and suitability of my improved device.

I have in Fig. 4 exemplified my improved device in connection with another type of wood working machine, namely a planing machine 49, comprising a driven shaft 50 of a usual rotary cutter-head 51, to which the armature shaft of the electric motor is secured by a usual flexible coupling 45.

My improved device may be employed in other relations, and is especially useful in rehabilitating old belt-driven machinery of the wood-working and other arts and changing the same into electric motor driven machinery, although it is obvious that my improved device is also applicable for new machinery.

It will be noted that in the exemplification, the base and the support are substantial castings, in the form of heavy frames, connected by substantial posts, received in substantial bearings in the base and in the support, for providing an economical rigid structure, the height of which is adjustable, so that the motor may be raised or lowered, in order that its motor shaft may be placed in axial line with the axis of rotation of the shaft which it is to operate.

My improved device forms a firm and rigidly connected structure and provides ready adjustment for alining the motor shaft with the driven shaft and for compensating for any change in relation between the motor stand and the machine, due to uneven settling of the floor on which the motor stand and machinery may be located, or due to wear of the bearings or journals of the electric motor or of the machinery, or for other changes affecting the alinement of said shafts.

My improved device is further arranged so that it may be placed in out of the way places, for instance, under stair-ways, and may be readily coupled to either of the ends of driven shafts for most convenient location.

Having thus fully described my invention, what I claim as new, and desire to secure by Letters Patent, is:

1. In a stand of the character described, the combination of an upper supporting frame having a supporting face, a base frame, said frames substantially provided with corners, upright posts at said respective corners, said upper supporting frame provided with downwardly presented bearings at the respective corners thereof for the upper ends of said posts, said base frame provided with upwardly presented bearings at the respective corners thereof for the lower ends of said posts, said bearings at said respective corners registering with each other, bolts threaded in the lower ends of said lower bearings and co-acting with the lower ends of said respective posts for independently axially adjusting said respective posts, whereby to adjust said supporting face to elevation and angularly with relation to a horizontal plane, the side walls of said last-named bearings formed as converging walls in cross-section, and clamping means in the walls of said last-named bearings for clamping said posts toward said converging walls in said last-named bearings.

2. In a stand of the character described, the combination of an upper supporting frame having a supporting face, a base frame, said frames substantially provided with corners, upright posts at said respective corners, said upper supporting frame provided with downwardly projecting socket formations at the respective corners thereof, said socket formations respectively having downwardly opening sockets having upper walls supported by the upper ends of said respective posts, said base frame provided with upwardly projecting socket formations at the respective corners thereof, said last-named socket-formations respectively having upwardly opening sockets having lower walls whereby the lower ends of said respective posts are supported, said sockets at said respective corners registering with each other, bolts threaded in said lower walls coacting with the lower ends of said respective posts for independently adjusting said respective posts, whereby to adjust said supporting face to elevation and angularly with relation to a horizontal plane, and means securing said posts in said sockets.

3. In a stand of the character described, the combination of an upper supporting frame having a supporting face arranged to receive an electric motor, a base frame, said frames substantially provided with corners, upright posts at said respective corners, said upper supporting frame comprising downwardly projecting socket formations at the respective corners thereof, said socket formations respectively having downwardly opening sockets having upper walls received crosswise of the upper ends of said respective posts for being supported by said respective posts, said base frame provided with upwardly projecting socket formations at the respective corners thereof respectively having upwardly opening sockets and walls extending crosswise of said sockets at the lower ends of said sockets, the sockets at said respective corners registering with each other and arranged for receiving said upright posts, and means in said lower walls in alinement with said posts having adjustable connections with said lower walls for axially adjusting said last-named means whereby to adjust said respective posts axially independently of each other for adjusting the axis of the rotor of said electric motor to elevation and with relation to a horizontal plane.

4. In a stand of the character described, the combination of an upper supporting frame having a supporting face arranged to receive an electric motor, a base frame, said frames substantially provided with corners, upright posts at said respective corners, said upper supporting frame comprising downwardly projecting socket formations at the respective corners thereof, said socket formations respectively having downwardly opening sockets having upper walls received crosswise of the upper ends of said respective posts for being supported by said respective posts, said base frame provided with upwardly projecting socket formations at the respective corners thereof respectively having upwardly opening sockets and walls extending crosswise of said sockets at the lower ends of said sockets, the sockets at said respective corners registering with each other and arranged for receiving said upright posts, means in said lower walls in alinement with said posts having adjustable connections with said lower walls for axially adjusting said last-named means whereby to adjust said respective posts axially independently of each other for adjusting the axis of the rotor of said electric motor to elevation and with relation to a horizontal plane, the side walls of said respective sockets formed as converging walls in cross-section, and bolts in the walls of said respective sockets having axes projected toward the converging points of said converging walls for clamping said posts in said sockets.

5. In a stand of the character described, the combination of an upper supporting frame having a supporting face arranged to receive an electric motor, a base frame, said frame substantially provided with corners, upright posts at said respective corners, said upper supporting frame comprising downwardly projecting socket formations at the respective corners thereof, said socket formations respectively having downwardly opening sockets having upper walls received crosswise of the upper ends of said respective posts for being supported by said respective posts, said base frame provided with upwardly projecting socket formations at the respective corners thereof respectively having upwardly opening sockets and walls extending crosswise of said sockets at the lower ends of said sockets, the sockets at said respective corners registering with each other and arranged for receiving said upright posts, and means in said lower walls in alinement with said posts having adjustable connections with said lower walls for axially adjusting said last-named means whereby to adjust said respective posts axially independently of each other for adjusting the axis of the rotor of said electric motor to elevation and with relation to a horizontal plane, and said socket formations on said base frame extending downwardly to form feet for said base frame.

In testimony whereof, I have hereunto signed my name.

JAMES J. SEXTON.